United States Patent
Goix et al.

(10) Patent No.: US 8,775,640 B2
(45) Date of Patent: Jul. 8, 2014

(54) METHOD AND SYSTEM OF INTERACTION BETWEEN ENTITIES ON A COMMUNICATION NETWORK

(75) Inventors: Laurent Walter Goix, Turin (IT); Hélène Radigois, Coueron (FR)

(73) Assignee: Telecom Italia S.p.A., Milan (IT)

( * ) Notice: Subject to any disclaimer, the term of this patent is extended or adjusted under 35 U.S.C. 154(b) by 751 days.

(21) Appl. No.: 11/663,060

(22) PCT Filed: Sep. 17, 2004

(86) PCT No.: PCT/EP2004/010419
§ 371 (c)(1),
(2), (4) Date: Mar. 19, 2008

(87) PCT Pub. No.: WO2006/029645
PCT Pub. Date: Mar. 23, 2006

(65) Prior Publication Data
US 2008/0263212 A1    Oct. 23, 2008

(51) Int. Cl.
*G06F 15/16*    (2006.01)
(52) U.S. Cl.
USPC .......................................................... 709/228
(58) Field of Classification Search
USPC ................................................. 709/227–228
See application file for complete search history.

(56) References Cited

U.S. PATENT DOCUMENTS

| | | | |
|---|---|---|---|
| 2002/0046239 A1* | 4/2002 | Stawikowski et al. | 709/203 |
| 2004/0153547 A1 | 8/2004 | Trossen | |
| 2004/0215824 A1* | 10/2004 | Payrits | 709/245 |
| 2005/0008022 A1* | 1/2005 | McClung et al. | 370/400 |
| 2005/0193124 A1* | 9/2005 | Chou et al. | 709/228 |
| 2006/0026288 A1* | 2/2006 | Acharya et al. | 709/227 |

FOREIGN PATENT DOCUMENTS

WO    WO 2004/059502    7/2004

OTHER PUBLICATIONS

Erik Christensen et al., Web Services Description Language (WSDL) 1.1, Mar. 2001, W3C Note, pp. 1-43.*
Liu, F. et al., "WSIP-Web Service SIP Endpoint for Converged Multimedia/Multimodal Communication Over IP," Proceedings of the IEEE International Conference on Web Services, Computer Society, pp. 690-697, (2004).
Cai, H. et al., "Session Initiation Protocol and Web Services for Next Generation Multimedia Applications," Proceedings of the IEEE Fourth International Symposium on Multimedia Software Engineering, Computer Society, pp. 70-80, (2002).

(Continued)

*Primary Examiner* — Krista Zele
*Assistant Examiner* — Esther Benoit
(74) *Attorney, Agent, or Firm* — Finnegan, Henderson, Farabow, Garrett & Dunner, L.L.P.

(57) ABSTRACT

A method and system of interaction between a requesting entity and a responding entity on a communication network based on the session initiation protocol (SIP). A machine-readable service description includes specifications of interaction between the requesting entity invoking a service at the responding entity and the responding entity offering the service. The specifications include at least a set of rules including abstract input/output message formats and SIP protocol binding rules so that the requesting entity may invoke the service to a SIP uniform resource identifier by means of SIP invocation message patterned according to the service description and it may interpret the response provided by the responding entity according to the service description.

45 Claims, 5 Drawing Sheets

(56) References Cited

OTHER PUBLICATIONS

Berger, S. et al., "Web Services on Mobile Devices-Implementation and Experience," Proceedings of the Fifth IEEE Workshop on Mobile Computing Systems & Applications, Computer Society, pp. 100-109, (2003).

Sens, T., "Next Generation of Unified Communication for Enterprise: New Communication Applications that are Accessible on Any Device are Helping Businesses to be Competitive in the Age of the Borderless Enterprise," Alcatel Telecommunications Review, $4^{th}$ Quarter 2002, pp. 1-8, (2002).

Wilkinson, N., "Representing Information," Next Generation Network Services, Chapter 8, John Wiley & Sons, Ltd., pp. 99-113, (2002).

Chinnici, R. et al., "Web Services Description Language (WSDL) Version 2.0, Part 1: Core Language," W3C Working Draft, Nov. 10, 2003, pp. 1-72, (2003).

Kristensen, A., "SIP Servlet API Version 1.0," pp. i-xii, and 1-108, (Feb. 4, 2003).

Lennox, et al., "CPL: A language for User Control of Internet Telephony Services," Internet Engineering Task Force, Internet Draft, pp. 1-83, (Oct. 2004).

Roach, A. B., "Session Initiation Protocol (SIP)—Specific Event Notification," Network Working Group, Request for Comments: 3265, pp. 1-30, (Jun. 2002).

Rosenberg, J. et al., "SIP: Session Initiation Protocol," Network Working Group, Request for Comments: 3261, Category: Standards Track, pp. 1-202, (Jun. 2002).

\* cited by examiner

METHOD AND SYSTEM OF INTERACTION BETWEEN ENTITIES ON A COMMUNICATION NETWORK

CROSS-REFERENCE TO RELATED APPLICATION

This application is a national phase application based on PCT/EP2004/010419, filed Sep. 17, 2004, the content of which is incorporated herein by reference.

BACKGROUND OF THE INVENTION

1. Field of the Invention

The present invention relates to the access from users to services or resources over the Internet, and particularly to the interaction between entities on a communication network through SIP (Session Initiation Protocol).

This invention relates in particular to the access to session- and subscription-based services through SIP (Session Initiation Protocol).

2. Background of the Invention

Different types of Internet-based services exist, such as transaction-based services (e.g. e-commerce), information services (e.g. web browsing), session-based services (e.g. video streaming, inter-personal multimedia communication) and subscription-based services (e.g. get updated about presence information), messaging-based services (e.g. instant messaging).

The Internet Engineering Task Force (IETF) has standardized in June 2002 the Session Initiation Protocol (SIP) (as available in the Request for Comments collection, RFC3261, by J. Rosenberg et al., on Jun. 10, 2004 at the complete URL http://www.ietf.org/rfc/rfc3261.txt) that provides a way to establish and control multimedia sessions over IP, as well as a framework for event notification and subscription management (SIP event framework) called Session Initiation Protocol (SIP)-Specific Event Notification (as available in the Request for Comments collection, RFC3265, by A. B. Roach, on Jun. 10, 2004 at the complete URL http://www.ietf.org/rfc/rfc3265.txt).

SIP-enabled multimedia communications include, but are not limited to, audio/video, data, messaging and event notification (such as presence) communications between two or more entities.

SIP protocol defines several types of methods (SIP methods) and related text-based messages (hereinafter SIP messages) between two entities, typically a client application and a server.

Each type of SIP method defines a different service model. SIP has, amongst others, service model types of:
    session (using the INVITE SIP method);
    subscription (using the SUBSCRIBE SIP method);
    asynchronous notification (using the NOTIFY SIP method); and
    messaging (using the MESSAGE SIP method).

For each type of service model, SIP protocol defines some basic message interactions between clients and servers, including message type and format. A SIP message includes some required information (for example some SIP headers) and can be extended with optional information depending on the SIP method and the service to invoke.

As an example, a user wishing to view a movie trailer would typically require its client application to use an INVITE method and to send an INVITE message to start a video session with a movie server. In another context, a user willing to be updated with information, e.g. about local weather, will use a SUBSCRIBE method by triggering a SUBSCRIBE message from its client application to a server, e.g. a weather forecast server.

Currently, one standard way to describe a service invocation through the SIP protocol between a client application and a server is to define a SIP Uniform Resource Identifier (SIP URI) where to invoke the service, and optionally the SIP method and the required input parameters with their position in the SIP message (e.g. "sip:weather@mycompany.com; method=SUSBCRIBE?event=weather&p-city=turin" defines a SIP URI, i.e. sip:weather@mycompany.com, and specifies that the SIP "SUBSCRIBE" method has to be used and that an "Event" header with value "weather" and a "P-City" header with value "turin" have to be inserted in the SIP SUBSCRIBE message.

By clicking on a hyperlink pointing to the SIP URI on a web page the client application associated with SIP hyperlinks of the type SIP-URIs constructs the SIP message with all these parameters, confident that it is exactly the format expected by the service. The input SIP message can be sent to the service and be processed at the server location in the right way.

However, using the above mechanism according to the SIP standard, the client application does not know the exact semantics of the answer from the service a priori without invoking the service and actually receiving the answer.

In other words, the client application will see what the response format is only when it receives a response from the service it has invoked.

Moreover, the comprehension of output data and parameters sent by the server to the client application may not be trivial, since some information can be included in headers or body of the SIP message and unknown to the user.

Due to these limitations, a SIP client application may not handle and process answers coming from a server automatically and/or correctly. This means that a SIP client application needs to conform to the answer it is going to receive.

Additionally, the above mechanism does not allow defining optional information that may or may not be sent by the client application when invoking the service.

Moreover, the above mechanism explicitly applies for a single service provider entity (responding at the specified SIP URI) and not to a plurality of provider entities or services.

In the context of session- and subscription-based services, formalisms are known to describe these services only for server's internal use.

Amongst them, scripting languages like Call Processing Language (CPL) (as retrieved on Jun. 10, 2004 at the complete URL http://www.ietf.org/internet-drafts/draft-ietf-iptel-cpl-09.txt), whose last version has been defined in April 2004 by the IETF, defines rules for processing session-based services in XML (eXtensible Mark-up Language).

This description, however, only defines the server's internal service logic and not the remote invocation mechanisms from the client application.

In a similar way to CPL description, Sun Microsystems and Dynamicsoft Inc. published in February 2003 the final release of SIP Servlet API v.1.0 Specification (available on Jun. 10, 2004 at the complete URL http://jcp.org/aboutjava/communityprocess/final/jsr116/index.html).

The SIP Servlet is a Java-based service logic executing on a SIP server that can listen to SIP messages coming from clients. The SIP servlet specification defines deployment descriptors for SIP servlets: these descriptors are XML-based files stored locally on a server that map an input filter based on a SIP message with a predefined SIP servlet. Whenever a SIP message arrives from a client application to the server, a SIP servlet container checks whether the message matches a filter defined in a descriptor. If so, the servlet container automatically triggers the service logic that corresponds to the matching filter in the descriptor.

This description is limited in the definition of input parameters and does not include any information about the output of the service toward the client application.

In the above-mentioned two formalisms, if a client application sends a SIP message to a server, once more it will not know exactly what will be the output of the server, if any, and thus it cannot handle and process answers correctly.

Furthermore, SIP event framework defines service model of asynchronous notification in subscription-based services, i.e. it allows a client application to subscribe to event occurrences during a certain period of time and to be dynamically notified by a server of each event occurrence during the period. The notification is sent by the server at times decided by the server.

SIP event framework suggests that the notification comprises data formatted according to a so called "SIP event package". The SIP event framework suggests the same approach for subscription to event occurrences.

SIP event framework is explicitly independent from the actual service data that is requested by the client, so that these mechanisms are open to apply to notification of any kind of event and related service data, for example online discovery/retrieving of specifications and/or availability information regarding the services currently provided by a server.

International Publication WO 2004/059502 A1 "Content and service registration, query and subscription, and notification in networks", published Jul. 15, 2004 describes a system and method using SIP protocol for discovery of availability and capability of services or content within a local network. This mechanism envision the client application to query explicitly for a specific service, and get notified about its providers and their specific capability information (typically SLP-based information in a local network).

The above known art does not apply to an unknown plurality of services, nor to telecommunication networks and services.

US Publication US 2004/0153547 "Service provisioning in a communication system", published Aug. 5, 2004 describes a mechanism using SIP protocol for provisioning event package descriptions to be used for subscriptions to services. The above method explicitly refers only to event packages description provisioning from a server to a client.

The WO 2004/059502 A1 and US 2004/0153547 fail to teach how a client application will receive answers by a server when invoking a service, it neither teaches how answered information is organized.

As an example, a user wishing to be updated with information about local weather, and subscribing at a server to a weather forecast service, will neither know how notification will occur, i.e. it will not be informed about the type, format, output parameters and transport protocol of the answer he should receive, before the notification itself, nor when updating information will be sent by the server.

Thus, on the basis of the known solutions in a SIP-based context, Applicant believes that formalisms defining session- and subscription-based services lack of a mechanism to describe semantics of interactions both from client applications to SIP resources offering these services and vice-versa.

To summarize, Applicant believes that the closest prior art related to SIP session- and subscription-based services fails to make available standard ways of describing how to invoke a SIP service, receive and understand the response. Current solutions to describe the operation or the invocation of such a service only cover a single aspect of this interaction, i.e. the input interaction between a client application and a server, but fail to teach how the server is going to act in response.

SUMMARY OF THE INVENTION

The aim of the present invention is therefore to provide a method and a system of interaction between entities through the SIP protocol to ease invocation of a service. Specifically, the invention seeks to provide a solution to correctly invoke and understand session- or subscription-based services on SIP protocol.

A further object of the invention is also to provide a solution for retrieving information at the client's side regarding the services currently provided by one or more servers, and being updated in real-time of any changes in service specifications and/or availability.

According to the present invention, these objects are achieved by means of a method and system of interaction between a first and second entity, as described herein.

Further objects of the invention are a machine-readable service description, a communication network and a computer program product or computer program set of program products as described herein.

Moreover, methods for providing a session-based service and a subscription-based service in a SIP context are also described herein.

In summary, in order to overcome the drawbacks of the prior art, the invention provides a service invocation mechanism to formally describe at least session- and subscription-based SIP services, including the provision of a service description or formalism intended to describe input and output message formats for invoking a SIP service and understanding its response on the side of the client application.

The service description includes the format specification of input and output messages as a set of abstract rules defining the message structure (in terms of attributes and parameters) for said service, and the implementation of those rules (binding) on the SIP protocol, for example indicating a list of entities, which provide this service. Moreover, the service description provided according to the invention includes some semantic information about the service, as for example information helping to identify the type of service requested (e.g. weather-related service) as well as the meaning of the parameters associated with the service.

Preferably, the invention envisions the use of extensions of Web Service Description Language (WSDL) to add support to session and subscription mechanisms and support binding for the SIP protocol and format.

The first version of WSDL has been defined by The World Wide Web Consortium in March 2001, and periodic updates have been made until the last version, WSDL 2.0, in November 2003 (published at the complete URL http://www.w3.org/2002/ws/desc/, as retrieved on Jun. 10, 2004).

The method and system according to the invention make use of the service description for a client application both to invoke a service to the relevant SIP Uniform Resource Identifier and to know a priori the expected answer, i.e. know where and how the parameters of invocation and response would or could be transmitted in the SIP request line, header or body of the exchanged SIP messages.

Advantageously, the availability of a common formalism to describe every aspect of a SIP service, including both input and output message formats in session- or subscription-based services, allows a client application to correctly interact with a service provider or another client application and be updated in case of dynamic creation and provision of services so as in case of modification of service parameters.

The invention proposes also a new mechanism for real-time notification of service availability, interaction rules and providers.

The architecture of this mechanism envisions a client application that is interested in getting updated about service description and availability. Updates are provided by a registry, which stores service-related information and maintains a state for each client application. Service description and availability is published by the service provider using a publication interface on the registry, or by a further entity on behalf of the service provider. Each time a change occurs in the registry that may be triggered by a new publication from a service provider, the registry will notify the interested client applications if the change matches their subscription filter, if any.

Using this architecture, subscriptions will provide information on new, changed or deleted entities within a registry as they occur during the whole subscription duration.

The invention can be used to deliver updates to client applications (including but not limited to end-user applications) either pushing or allowing them to download updated machine-readable descriptions of available services without requiring any intervention from the user itself. It is to note that the information provided in notifications is related to service interaction description and is independent from the service data that may be retrieved when invoking the described service.

According to one aspect of the invention, a client entity (a user or network application or resource, commonly and hereinafter referred to as "client (subscriber) application") is allowed to subscribe to a notification service providing a single service description and be dynamically notified about it, for example on how and where to invoke the service and how to interpret the expected answer, if any. This includes as well a mechanism to query and fetch a single service description, and allows the client application to be notified automatically as soon as an updated description is available. As mentioned above, such changes can be for example related to interaction mechanisms, service availability or the number of service providers for this service. The actual service description may be sent inline or indirectly and referenced using some pointer to a network-based server which hosts the service description, for example through a URI. Subscriptions or queries may include filters to refine the service description notified to the subscriber application.

According to another aspect of the invention, the subscriber application is allowed to subscribe to a list of service descriptions, explicitly (by requesting a known list of services) or implicitly (by requesting an unknown list of services), and being dynamically notified about every single service description. This includes as well a mechanism to query and fetch a list of service descriptions, and allows the subscriber application to be notified automatically as soon as an updated description is available for a service, or whenever a change occurs in the service description list (addition/removal of service descriptions). Subscriptions or queries may include filters to refine the service description notified to the subscriber application.

The invention also defines a way for a service provider server, or a resource on behalf of it (hereinafter referred to as "publisher"), to publish the description of one or more services to at least one other entity (network-based resource).

According to an additional aspect of the invention, it is proposed a system to aggregate service descriptions from more network-based resources to optionally obtain a list of resources that provide a similar service, and to compose a new description of the service.

BRIEF DESCRIPTION OF THE DRAWINGS

Further characteristics and advantages of the invention will be explained in more detail in the following description, provided by way of non-limiting example with reference to the appended Figures, in which.

DETAILED DESCRIPTION OF A PREFERRED EMBODIMENT

Figure 1:
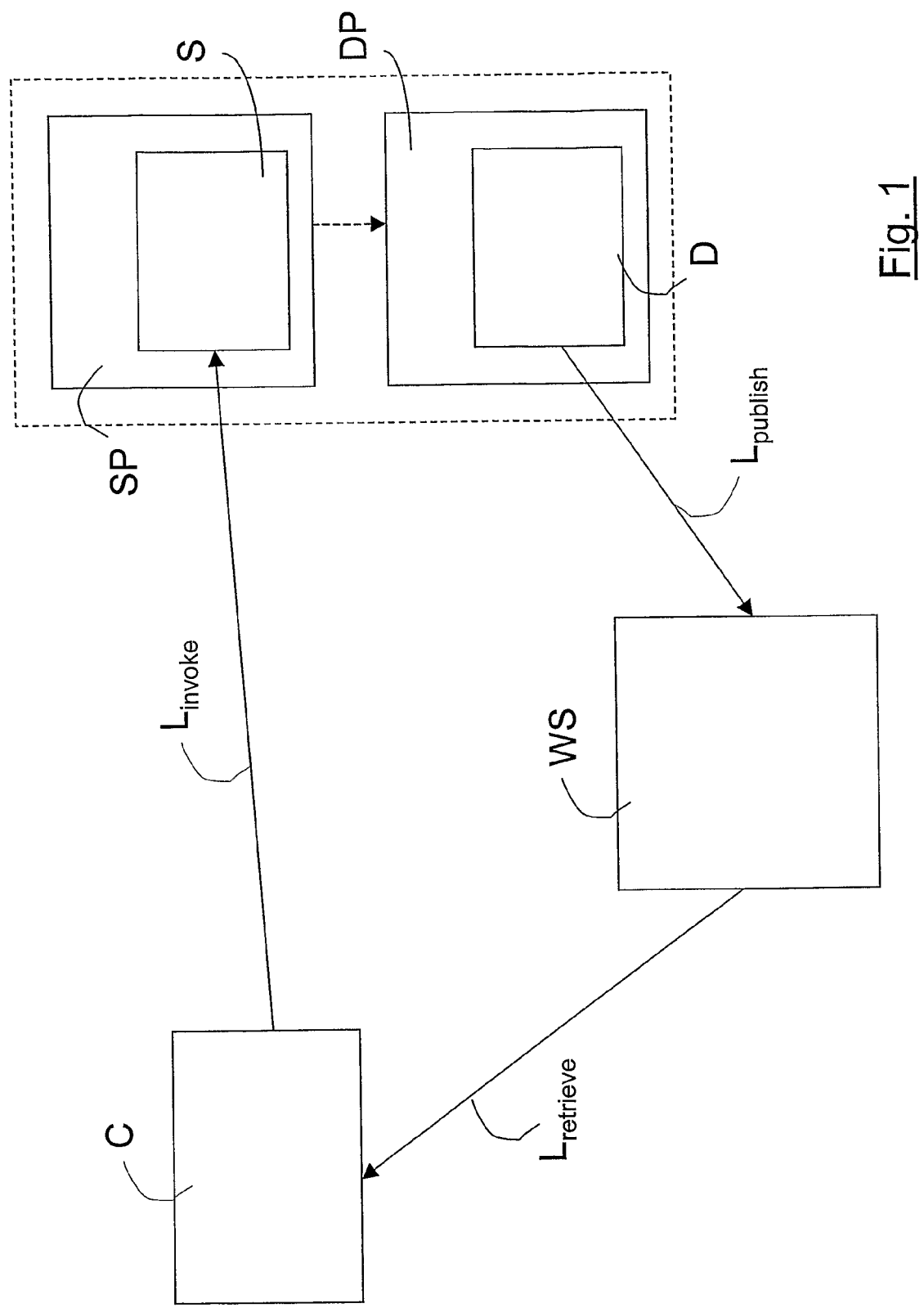
FIG. 1 is a block diagram of a functional architecture for session- and subscription-based SIP services invocation by a client, according to the invention.

The functional architecture related to a typical access scenario to a session- or subscription-based SIP service is shown in FIG. 1.

A client entity C, such as a client application, wishing to invoke a session or subscription SIP service S is connected to a service provider or server SP over a direct network-based communication link $L_{invoke}$. A service description provider DP, which provides a service description D for service S, is arranged to be coupled to, for instance, a web server WS over a direct network-based communication link $L_{publish}$, the web server WS being intended to publish a SIP service description D supplied by service description provider DP. The client application C is arranged to be connected to web server WS to retrieve published service description D over a direct network-based communication link $L_{retrieve}$. The service description provider DP may be coupled to the service provider SP.

In the preferred embodiment the service provider SP is associated to a SIP server, but, according to further embodiments of present invention, the service provider SP may also be another client application.

A typical client application includes a set of computer program modules for performing network operations such as access to remote resources or services.

SIP-based services can be invoked sending a SIP message from client application C to the service provider SP or to another client application.

SIP protocol defines several types of message between a client application C and a server SP, and each type of message defines a different service model. SIP has, amongst others, concepts of session (instantiated by the INVITE method), of subscription (SUBSCRIBE method), and of asynchronous notification (NOTIFY method). Hence there is a need for the client application to know which type of SIP message is required by the service at each step of the invocation process.

Moreover, SIP envisions two types of messages: requests and responses. SIP requests can be initiated both by client applications and servers. SIP responses are triggered by SIP requests and can also be sent both by client applications and servers. For convenience, in the following of the description and in the appended claims it is referred to the client application as the entity sending a request and the server or service provider as the entity receiving the request and sending a response, but it should be understood that the vice versa is possible, without departing from the scope of the invention.

The following is an example of a SIP INVITE request message.

```
INVITE sip:user@example.com SIP/2.0
                                                  [SIP Request-line]
Via: SIP/2.0/UDP 10.0.0.1:5060;branch=z9hG4bKcaaaaaaaaa
Content-Length: ...
Max-Forwards: 70
Content-Type: application/sdp
To: <sip:user@example.com>
From: "12345" <sip:12345@test.org>;tag=b0ddb34d
Call-ID: b0ddb34d@10.0.0.1
CSeq: 1413209355 INVITE
Allow: INVITE, ACK, CANCEL, OPTIONS, BYE
Contact: <sip:10.0.0.1:5060>
                                                      [SIP headers]
v=0
o=ntzum 734274293 734274293 IN IP4 10.0.0.1
s=-
c=IN IP4 10.0.0.1
t=0 0
m=audio 22000 RTP/AVP 4
a=rtpmap:4 G723/8000
m=video 22002 RTP/AVP 34
a=rtpmap:34 H263/90000
                                                  [SIP message body]
```

As shown, a SIP message is composed of 3 sections:
a SIP Request-Line, which contains the SIP method (e.g. INVITE) and the SIP Request-URI, which is used for SIP message routing between the client application C and its final destination (e.g. the server SP);

a list of SIP headers; some of these headers are required for SIP message processing within a SIP network (e.g. "From:", "To:", etc.), but some of them are optional (e.g. "Allow:");

optionally, a SIP message can include a message body; when present, the body corresponds to a specific MIME content, whose type is described in the SIP "Content-Type:" header.

According to a preferred embodiment of present invention, in order to ease invocation and interpretation of a SIP service S and of the related service data, service description provider DP publishes a service description D of the SIP service S provided by service provider SP, e.g. by making it available at web server WS through link $L_{publish}$.

Prior to actually invoking the service S at service provider SP, client application C first retrieves service description D, e.g. from server WS through link $L_{retrieve}$, according to a mechanism independent from the service (e.g. through HTTP request to web server WS).

The service description D gives information to the client application about where and how to invoke the service, and also about how the service will answer remotely to the application. It includes, but is not limited to, a machine-readable description including specifications of interaction between a requesting entity and a responding entity, said specifications comprising at least a set of rules describing required and/or optional input and output message formats and their actual implementation over (binding with) SIP protocol for accessing a service S supplied by provider SP.

For example, the service S can be a session-based or subscription-based service, i.e. a service, which needs an explicit request/invocation by the client, which related service data is supplied over a protracted time and which is concluded by an explicit termination.

In the following, service supplied over a protracted time is intended as a service where at least one of the actions of sending and receiving service data between entities involved in the service is protracted over time:
either continuously (as in a session-based service, where the action of sending and/or receiving service data is continuous in time),
or intermittently (as in a subscription-based service, where the action of sending and/or receiving service data is plural and executed at different points of time, e.g. on a periodic basis).

A service supplied over a protracted time is intended as opposed to a service of the type "request-response", where a single instant request is answered with a single instant response and the action of sending and/or receiving service data is executed only once at a specific point of time.

The requirements for the description of SIP-based services according to the invention are hereinafter described in more detail.

The service description formalism for SIP-based services supports the syntactic definition of any type of SIP message, allowing the following flexibility:
it specifies the SIP message type used by the service (SIP request or SIP response);
when a SIP request, it specifies which method is to be used by the service, and what is the URI where the service can be accessed;
it defines the headers that can be sent within the SIP message, both required and optional;
it specifies if a message body is required in the SIP message and if so, it defines its content type, format and optionally value;

Additionally, the service description formalism supports the following concepts:
the generic type of service, e.g. a subscription, a session, etc.;
the model of service, i.e. the interaction(s) between the requesting entity and the responding entity (e.g. "in multi-out");
which message contains service-related data, if any (e.g. SIP request or SIP response);
whether some specific extension is required.

Session-based services have specific concepts addressed, such as:
the session description in terms of media (e.g. audio, video, application or data), protocols, codecs, etc.;
the session duration;
the session setup mechanism.

Subscription-based services also have specific concepts addressed, such as:
the subscription duration;
the notification mechanism (periodic/asynchronous, single/multiple) and, when periodic, the interval of notification;
the type of event to be considered within the subscription duration.

Beside syntactic, machine-readable description, the service description may include human-readable description and/or semantic information related to the service, for example described in OWL (Ontology Web Language).

According to a preferred embodiment, the service description formalism disclosed in the following description for session- and subscription-based services making use of SIP as a transport protocol is defined extending WSDL syntax to add support for such services through a SIP binding that answers to service description requirements listed in the previous section. However, syntaxes completely different from that of WSDL may be generated without affecting the inventive principles of the present invention.

With reference to WSDL, which is a language well known to a man skilled in the art and therefore need not to be discussed in detail in the present application, when describing a SIP message for the purposes of the invention, i.e. to define any type of service and to enable the extensibility of the invention, the verb attribute defined in the HTTP binding of the WSDL specification is reused to specify the type of SIP-message to be used in the service interaction. However, if this attribute is used only at binding level in WSDL specification, the present invention defines it also at message level.

Within SIP messages, service-related parameters can be specified in the SIP Request-URI, in a header or in the body of the message. Hence, the way in which the input (from client of server) and output (from server to client) parameters are exchanged between the SIP client application and the SIP server must be defined clearly, so that the client application knows where to find the information included in the SIP messages, and how to interpret it correctly.

A message element is defined to select a message format (SUBSCRIBE, NOTIFY, INVITE, . . . ) and the way the input and output parameters are going to be transmitted. This element is placed inside the input and output elements of the binding's operation.

An example of a message element is as follows:

```
<sip:message verb="xs:string"? uristyle="sip:UristyleChoice"?
location=xs:uriReference"? />
<simpleType name="UristyleChoice">
    <restriction base="string">
        <enumeration value="urlEncoded"/>
        <enumeration value="urlReplacement"/>
        <enumeration value="userReplacement"/>
    </restriction>
</simpleType>
```

The verb attribute is used to specify the message format. This attribute would assume any value, so that the output message could be transported either by a SIP request or by a SIP response. In case of a SIP request, the value corresponds to the SIP method to be used (e.g. "INVITE", "SUBSCRIBE"). In case of a SIP response, the value "response" is used.

This attribute is not required in the message element if a default attribute (verbDefault) is defined in the operation and binding elements. However, each message must have a verb or verbDefault attribute defined. If a verbDefault attribute is defined and the message element includes a verb attribute, then only the latter value has to be considered.

The uristyle attribute is used whenever there is the need to send service-related parameters (parts) within the SIP Request-URI. This attribute should not be present if all parts are to be sent within the SIP message body or a SIP header.

Within the SIP Request-URI, parameters can be transmitted:
  as uri-parameters, encoding automatically all parts that need to be sent and do not appear in the SIP message body or SIP header, using the "urlEncoded" value.

For example, assuming to send "param1" and "param2" parameters, respectively with "value1" and "value2", the "urlEncoded" style will encode the parts into the SIP Request-URI as:
  ;param1=value1;param2=value2
  as other-parameters by replacing a relative URI pattern of parts (defined in the location attribute of the message element, or the operation element) using the "urlReplacement" value. In this case, parts can be replicated both in the SIP Request-URI and in a SIP header or the SIP message body if necessary.

Following the previous example, "urlReplacement" will trans-form the ";param=test;test={param1}.{param2}" pattern into:
  ;param=test;test=value1.value2
  as userinfo of the SIP Request-URI replacing the existing one, if any, with a pattern of parts (defined in the location attribute of the message element, or the operation element) using the "userReplacement" value.

Following the previous example, "userReplacement" will trans-form the "service.{param1}.{param2}" pattern as username into the SIP Request-URI as:
  service.value1.value2

The location attribute defines a pattern of parts to use to extend the SIP Request-URI. No meaning is currently associated to this attribute when used with "urlEncoded" value of uristyle attribute.

When not transmitted into the SIP Request-URI, message parts can be sent either in the SIP message body or in a SIP header. Since message body format and header names are extensible, specific elements are defined to clearly describe how each part of the message will be transmitted.

SIP message body, when present, must pertain at a MIME type. Hence, parts inserted into the SIP message body can be defined following the MIME binding for WSDL or through another mechanism. For example, XML-based content can be inserted as:

```
<sip:contentxml part="NMTOKEN" type="xs:string"/>
```

The contentxml element defines how to insert an XML-based part into the SIP message body.

The part attribute references the name of the part in the message to be sent, which type may refer to an external XML type in an external XML namespace.

The type attribute defines the MIME type of the XML content.

The header element defines how to insert a message part into a SIP header, and its structure is:

```
<sip:header name="xs:string" part="xs:NMTOKEN"
required="xs:boolean"/>
```

The part attribute references the name of the part in the message to be sent.

The name attribute defines the name of the SIP header that will contain the value of the part.

The required attribute specifies whether this header is required for the correct processing of the message.

The binding element defines the mapping of a service model on a specific transport protocol that will be used to transport the input and output messages, if any. The flexibility of the solution is guaranteed by the fact that the output can be none, one or multiple and that it can be transported by both a SIP request and a SIP response.

For the sake of conformity with the terminology used in HTTP and SOAP bindings defined in WSDL specification, binding and operation are defined, respectively identifying the transport protocol and the service location, as follows.

```
<sip:binding transport="xs:anyURI" verbDefault="xs:string"?
styleDefault="sip:styleChoice"?/>
    <sip:operation location="xs:anyURI"? verbDefault="xs:string"?
    style="sip:styleChoice"? minDuration="xs:integer"? event="xs:string"?
    />?
```

```
<simpleType name="styleChoice">
    <restriction base="string">
        <enumeration value="session"/> <!-- INVITE method -->
        <enumeration value="subscription"/> <!-- SUBSCRIBE method -->
        <enumeration value="rpc"/> <!-- SERVICE method -->
    </restriction>
</simpleType>
```

A verbDefault attribute is added to provide a default format for a specific operation or binding, in order not to have to specify it in all messages.

Additionally, a style and styleDefault attribute are added to specify a standard SIP behavior, such as "session", "subscription" or "rpc" (Remote Procedure Call). These definitions implicitly define message verbs, message exchange and simplify the definition of a service. For example, the "subscription" style would implicitly correspond to an exchange of "SUBSCRIBE" messages in input and multiple "NOTIFY" messages in output in an asynchronous way for a SIP-based sub-scription service. styleDefault attribute with binding owner applies when no style attribute with operation owner applies.

The transport attribute with binding owner aims to know which protocol will be used to access the service. It references a URI that points to the document that describes the transport protocol to use.

The location attribute with operation owner defines the default SIP URI parameter pattern to apply by default to all request messages exchanged within this operation.

In the operation owner are defined two extra attributes specifically related to subscription-based services: minDuration and event. The event attribute specifies to which event the subscription is related. The minDuration defines the minimum subscription duration (e.g. in seconds) accepted by the service.

In order to specify where to access the service, a section is provided in a WSDL document, which defines in particular the URI where the service has to be invoked.

WSDL standard accepts any kind of URI format as contact point. However, an extension is described here to support definition of patterns of SIP URIs.

To respect the terminology used in HTTP and SOAP bindings, an address element is added to the syntax for SIP-based services to identify the SIP resource where the service is located.
<sip:address location="xs:string"/>

The value of the location attribute can represent a single SIP URI or a pattern that can define a number of SIP URIs at which the described service can be invoked by the client application.

For example, location value of "sip:0039[0-9]*@mycompany.com" specifies that the service is supported by any SIP resource, whose SIP URI starts with "0039" and belongs to the "mycompany.com" domain, while other SIP URIs may not support the service.

In the following, two examples of service description formalism according to the invention are presented, which describe a SIP subscription-based service and a SIP session-based service, respectively.

EXAMPLE 1

In the following example a subscription-based service is described. Specifically, the exemplary description defines a meteorology service that can notify a client about weather forecast updates for a specific city.

The service defines a single operation (named subscribeWeatherForecast), which requires, as input message, the name of a city (named request) and returns the weather forecast for the given city as output (named response), as a forecast string associated with an icon.

According to the WSDL syntax preferably taken as a model for the SIP service description, first of all, an abstract portion of the description is given, where message names and their parts are defined in a conceptual way, then, in the binding section, a material way is described to invoke the service using SIP as transport protocol.

Parts of the description which constitute the extended WSDL syntax according to the invention for describing a subscription-based service are indicated in bold.

```
<message name="request">
    <part name="city" type="xsd:string"/>
</message>
<message name="response">
    <part name="forecast" type="xsd:string"/>
    <part name="icon" type="xsd:binary"/>
</message>
<portType name="weather">
    <operation name="subscribeWeatherForecast">
        <input message="tns:request"/>
        <output message="tns:response"/>
    </operation>
</portType>
<binding name="sipWeather" type="weather">
<sip:binding styleDefault="subscription" />
    <operation name="subscribeWeatherForecast">
        <sip:operation minDuration="3600" event="weather" />
        <input>
            <sip:message verb="SUBSCRIBE" uristyle="urlEncoded" />
        </input>
        <output>
            <sip:message verb="NOTIFY" />
            <mime:multipartRelated>
                <mime:part>
                    <mime:content part="forecast" type="text/html"/>
                </mime:part>
                <mime:part>
                    <mime:content part="icon" type="image/gif"/>
                    <mime:content part="icon" type="image/jpeg"/>
                </mime:part>
            </mime:multipartRelated>
        </output>
    </operation>
</binding>
<service name="weatherService">
    <port name="subscriptionWeatherService"
    binding="tns:sipWeather">
        <sip:address location="sip:weather@mycompany.com" />
    </port>
</service>
```

The above description specifies that:
to invoke the service, a "SUBSCRIBE" message has to be sent to "sip:weather@mycompany.com" (address), with the name of the city encoded in the SIP Request-URI (urlEncoded), i.e.:
SUBSCRIBE sip:weather@mycompany.com; city=turin SIP/2.0
the SIP "SUBSCRIBE" message needs to include a SIP "Event:" header with value "weather" (the type of event), and a SIP "Expires:" header with value equal or greater than "3600" (the subscription minimum duration in seconds), i.e.

Event: weather
Expires: 10000 a set of SIP "NOTIFY" messages are output from the service in an asynchronous way with the weather forecast information encoded in MIME format in the SIP message body, containing a textual information and a small icon illustrating the forecast.

EXAMPLE 2

In the following example a streaming (session-based) service is described. Specifically, the exemplary description defines a service providing a way to call a movie server and watch a movie trailer on demand.

The service defines a single operation (named streamMovieTrailer), which requires, as input message (named request), the name of the desired movie ("movie" part) and the description of user-side media capabilities ("offer" part) and returns (named response) a description of service-side media capabilities ("answer" part), then starting the streaming of the movie.

According to the WSDL syntax preferably taken as a model for the SIP service description, first of all, an abstract portion of the description is given, where message names and their parts are defined in a conceptual way, then, in the binding section, a material way is described to invoke the service using SIP as transport protocol.

Parts of the description which constitute the extended WSDL syntax according to the invention for describing a session-based service are indicated in bold.

```
<message name="request">
    <part name="movie" type="xsd:string"/>
    <part name="offer" type="xsd:string"/>
</message>
<message name="response">
    <part name="answer" type="xsd:string"/>
</message>
<portType name="movieStreaming">
    <operation name="streamMovieTrailer">
        <input message="tns:request"/>
        <output message="tns:response"/>
    </operation>
</portType>
<binding name="sipTrailer" type="streamMovieTrailer">
<sip:binding styleDefault="session" />
    <operation name="streamMovieTrailer">
    <input>
        <sip:message verb="INVITE" />
        <sip:header part="movie" name="P-Movie"
required="true"/>
        <mime:content part="offer" type="application/sdp"/>
    </input>
    <output>
        <sip:message verb="response" />
        <mime:content part="answer" type="application/sdp"/>
    </output>
    </operation>
</binding>
<service name="streamingService">
    <port name="movieStreamingService" binding="tns:sipTrailer">
        <sip:address location="sip:streaming@mycompany.com"/>
    </port>
</service>
```

The above description specifies that:

to correctly invoke the service, an SIP "INVITE" message has to be sent to "sip:streaming mycompany.com" with a specific SIP header ("P-Movie:") containing the name of the movie and the description of the user-side media capabilities passed as SDP description in the SIP message body, i.e.:

```
INVITE sip:streaming@mycompany.com SIP/2.0
P-Movie: The Matrix
``` the service will then answer with a SIP response ("response" verb) containing the description of its media capabilities in SDP in the SIP message body.

Now, having described the formalism according to which a session- or subscription-based service description is provided by the service description provider DP, with reference to FIGS. 2 to 5 a preferred service description transferring method, alternative to that of FIG. 1, is disclosed.

A service description is transferred to the client application by mean of a network-based communication. This communication can be a direct communication between the client application C and the service description provider DP or, according to FIG. 1, an indirect communication between the client application C and the service description provider DP through a server WS.

For example, the communication between the client application C and the service description provider DP is indirect when the service description provider DP transfers the service description D on a web server WS through a network-based communication in a first step, and the client application C retrieves the service description D from the web server WS in a second step through another network-based communication.

A preferred mechanism for real-time notification of service descriptions using the SIP protocol is described hereinafter.

Figure 2:
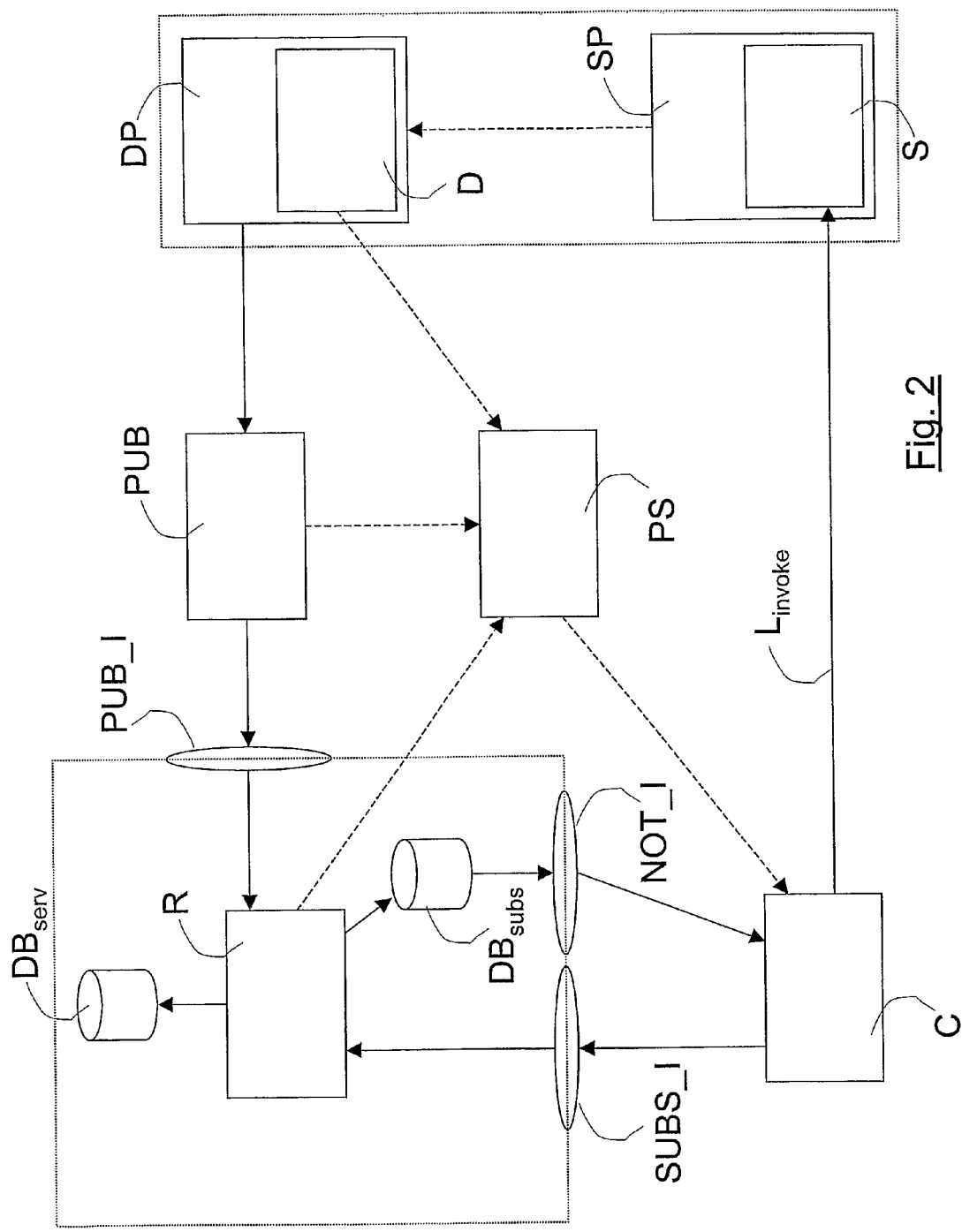
FIG. 2 is a block diagram of a functional architecture for service description notification to a client.

FIG. 2 shows the functional architecture related to a typical usage scenario of the service description notification method according to the invention.

A client entity (hereinafter "subscriber application") is indicated C and a SIP service provider is indicated SP, as in FIG. 1. Service provider SP offers a SIP service S described by an associated service description D provided by service description provider DP, and the subscriber application may invoke said service S on a direct communication link $L_{invoke}$.

Subscriber application C is arranged to be coupled to a registry R in uplink for requesting data about current service information through a subscription interface SUBS_I. Registry R is coupled to a service database $DB_{serv}$ storing service information such as availability and service description D of service S, and a subscription database $DB_{subs}$ storing subscriptions of subscriber application C.

The registry may be a UDDI (Universal Description, Discovery and Integration) registry or a SIP Event Server or any kind of component or group of components that provides at least a publication interface and an inquiry interface and/or sub-scription and notification interface.

For the sake of clarity, FIG. 2 shows a single client application C and a service provider SP and a related service S, but the following disclosure applies to a general architecture comprising a plurality of subscriber applications and service providers, each offering one or more services.

Registry R is arranged to be downlink coupled to subscriber application C for informing about current service information through a notification interface NOT_I, associated with subscription database $DB_{subs}$.

Service provider SP may be coupled with service description provider DP for providing service description D. The service description provider DP may be part of the service provider SP or, according to further embodiments, standalone.

Service description provider DP is arranged to be coupled to a publisher entity PUB. In addition, service description provider DP may also be coupled to a publication server PS for storing service description D. Alternatively, the publication server PS may receive service description D from the publisher entity PUB itself or from registry R, as shown in broken lines. Registry R is also connectable to publisher entity PUB by means of a publication interface PUB_I. The publisher entity PUB may be part of the service description provider DP or standalone. The publication server PS (e.g. a web server) may be part of the publisher entity PUB, the service description provider DP or the registry R, or it may be a standalone entity.

In the following, the case is presented where a subscriber application C wishes to subscribe to information about a service S and be notified as soon as information update is published for the service. Service information can be related to the availability of a service, service-specific information or to a service description D of remote interaction mechanisms that can be used by subscriber applications, for example for GUI automatic generation or some automated action.

Notifications as defined in the invention may contain the related information inline or may contain a pointer to a resource providing the information, or may not carry any related information other than the event occurrence itself.

The subscriber application C requests the registry R to be notified about information related to the service S through the subscription interface SUBS_I, optionally including filtering parameters about notification conditions or information filtering (e.g. the application is interested in all notifications but only in part of the information).

The registry R stores the subscription into subscription database $DB_{subs}$, and may check immediately about current information related to the requested service in service database $DB_{serv}$. If some information is found in the service database and if the service information matches optional rules and filters provided by the subscriber application C or applied by the registry R, the registry R sends a notification to the subscriber application C through the notification interface NOT_I, informing the subscriber application C about the current service information. This notification may include the actual service information or a pointer to it, and in particular it may include service description D or a pointer to it on publication server PS (e.g. a HTTP URL).

Upon notification from the registry R, the subscriber application C may automatically download the service information and/or service description D from publication server PS and process it, for example to generate a GUI to display to the user.

The subscriber application may further invoke the service S based on such description information, using the SIP SERVICE message, HTTP, SOAP or any other SIP or other network-based communication protocol message.

At any point of time, the service provider SP that provides service S, or an external entity on behalf of it (namely service description provider DP), may publish over a network some information about the service S, for example when the service becomes available, whether its description has been updated, or based on external conditions.

To this aim, the service description provider DP asks publisher entity PUB to publish the service description D by either sending the actual service description D, which is defined according to the invention, to the publisher entity PUB, or by sending a pointer to the service description D which can be retrieved from the publication server PS. Either way, the publisher PUB can further store the service description D on publication server PS.

The publisher entity PUB sends the service information (containing the service description D or a pointer to it) to the registry R through publication interface PUB_I, asking the registry R to store this service information into the service database $DB_{serv}$. Service information publication can be done using SIP PUBLISH message, HTTP, SOAP or any other SIP or other protocol message. Service description D can be embedded into the SIP PUBLISH message (e.g. as MIME "application/wsdl+xml" content type) or indirected via a pointer to a remote resource (e.g. through a HTTP URL pointing to publication server PS).

The registry R stores the service information in service database $DB_{serv}$ and checks into subscription database $DB_{subs}$ whether any subscriber application C has subscribed for information related to this service S, or to a list of services that includes service S. For any reference to a subscriber application C found in the subscription database $DB_{subs}$, and if the published service information matches optional rules and filters provided by the subscriber application C or applied by the registry R, the registry R sends a notification to the subscriber application C through the notification interface NOT_I, informing about some change in the service information stored in the registry, if any. This notification includes service information or a pointer to it, and may include service description D or a pointer to it on publication server PS (e.g. a HTTP URL). Notifications may be related to changes in service availability, service description D or other service-related information.

Notification processing at subscriber application C may follow the same behaviour as during the first notification.

Naturally, a client application C can also access directly to publication server PS and retrieve service description D, without being notified by registry R offering a subscription service on service description updates.

The above-described method applies in the same way to list of services. In this case, notification may be triggered by any of the changes related to a single service, and also by changes related to the addition or removal of services that match subscription criteria.

Figure 3:
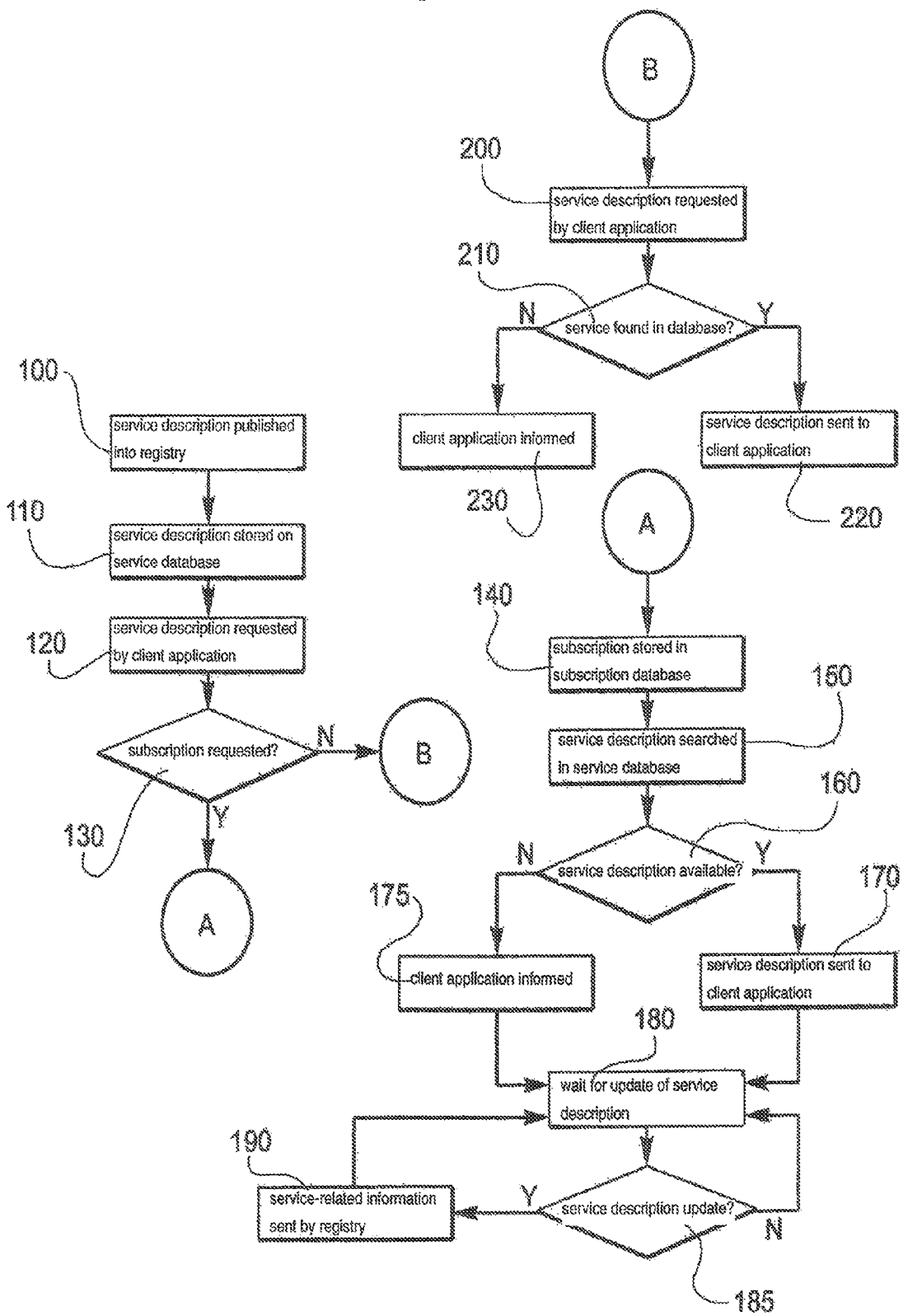
FIG. 3 is a flow chart of the notification mechanism of a single service description according to the invention.

FIG. 3 shows a flow chart of the notification mechanism of a single service description.

First of all, publisher PUB publishes a service description D into the registry R (step 100). The registry R stores the service description D on service database $DB_{serv}$ (step 110).

Then a client application C makes a request, e.g. a subscription, for the service description D of a specific service S to registry R (step 120). At step 130 the registry R checks whether this request is a subscription or a single query.

If the request from the client application C to the registry R is a subscription (A-part of the flow chart), the registry R first stores the subscription into its subscription database $DB_{subs}$ at step 140, then it searches a service description D corresponding to the requested service S in the service database $DB_{serv}$ (step 150) and checks whether the service description is available (step 160). If so, it sends the service description D to the client application C at step 170, then waits for an update of service description D at step 180 checking for it (step 185). If the service description is not found, the registry R informs the client application C that no service description is currently available at step 175, then waits for an update of service description D at step 180 checking for it (step 185).

When the requested service S changes status and/or a new service description D is available for the service S (step 185) and/or a predetermined time is elapsed, the registry R informs the client application C and sends service-related information (availability and/or service description D) at step 190.

If the request is a single query (B-part of the flow chart), the registry R searches into its service database $DB_{serv}$ the service description D associated with the service S requested by the client application C at step 200. The registry R checks its service database $DB_{serv}$ at step 210. If the service S is found, then the registry R sends the service description D to the client application C at step 220, otherwise it informs the client application C that no service description was found for this service S at step 230.

Figure 4:
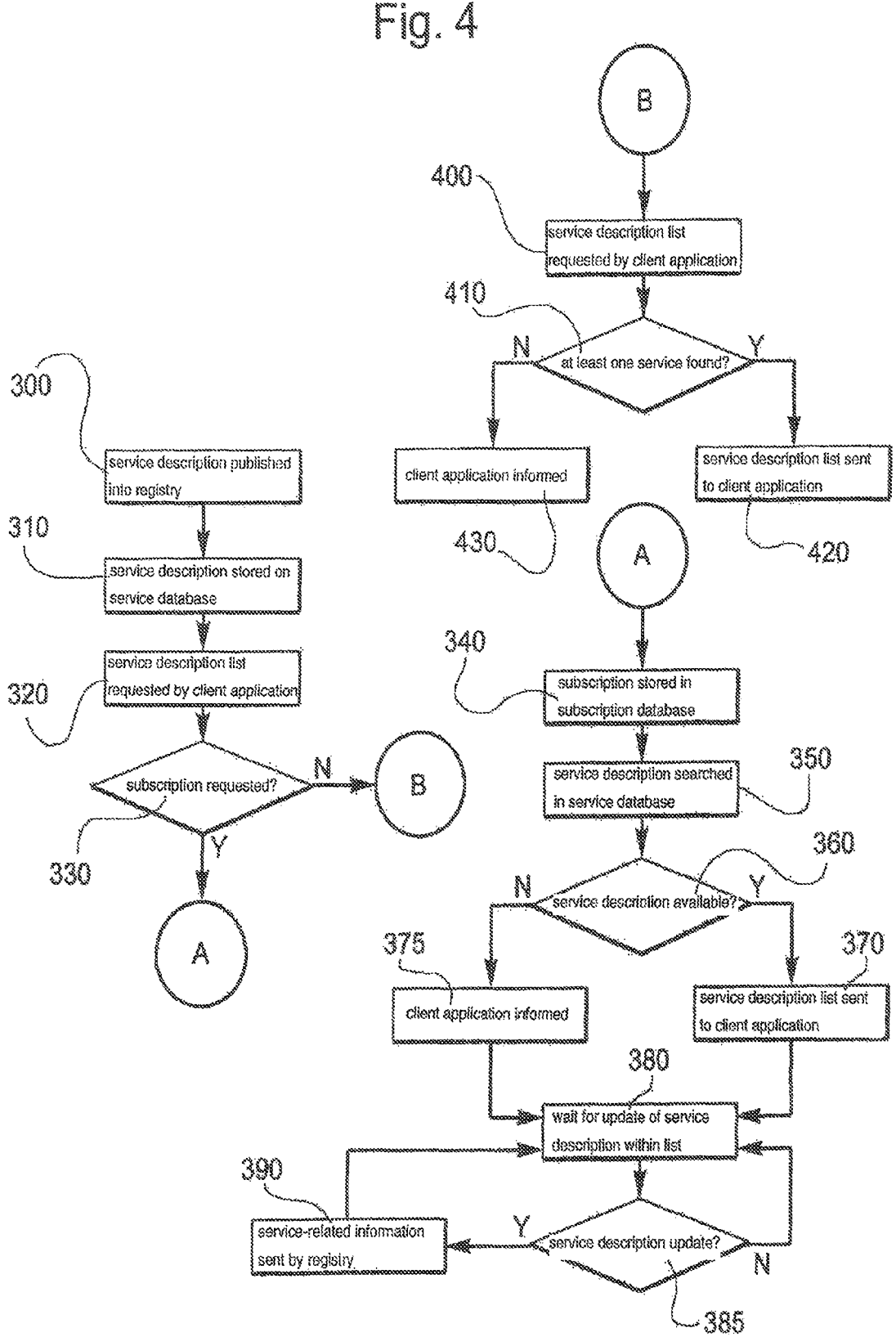
FIG. 4 is a flow chart of the notification mechanism of a list of service descriptions according to the invention.

FIG. 4 shows a flow chart of the notification mechanism of a list of service descriptions.

First of all, publisher PUB publishes a service description D into the registry R (step 300). The registry stores the service description D on service database $DB_{serv}$ (step 310).

Then a client application C makes a request, e.g. a subscription, for the service descriptions of a list of services to registry R (step 320).

The list may comprise a static or dynamic number of services, known or unknown to the client application.

At step 330 the registry R checks whether this request is a subscription or a single query.

If the request from the client application C to the registry R is a subscription (A-part of the flow chart), the registry R first stores the subscription into its subscription database $DB_{subs}$ at step 340, then it searches for service descriptions corresponding to the requested list of services in the service database $DB_{serv}$ (step 350) and checks whether at least one service description D is available (step 360). If so, it sends the list of available service descriptions to the client application C at step 370, then waits for an update of any service description within the list of services, or for an update of the list itself (added/removed service) at step 380 checking for it (step 385). If no service description is found for any service of the list, the registry R informs the client application C that no service description is currently available at step 375, then waits for an update of any service description within the list of services, or for an update of the list itself (added/removed service) at step 380 checking for it (step 385).

When one of the service of the list (or the list itself) changes status and/or a new service description D is available for a service (step 385) and/or a predetermined time is elapsed, the registry R informs the client application C and sends service-related information (availability, list and/or service description) at step 390.

If the request is a single query (B-part of the flow chart), the registry R searches into its service database $DB_{serv}$ for service descriptions corresponding to the requested list of services requested by the client application C at step 400. The registry R checks its service database $DB_{serv}$ at step 410. If at least one service is found, then the registry R send the list of available service descriptions to the client application C at step 420, otherwise it informs the client application C that no service description was found for any service of the list at step 430.

An example of both a mechanism for service description spontaneous publication/advertising by service description provider DP and for subscription-based service description notification by register R is given below.

For clarity purposes, in the following "advertising" refers to the concept of spontaneous advertising action, i.e. publication by service description provider DP, while "discovery" refers to the concept of subscription-based action, i.e. notification to client application C.

Conveniently, the actual content of the published information may be filtered or modified in any way by one or more entities interposed between the publisher entity PUB and the receiver of the service information, namely the registry R or the client application C.

In the example SIP is used as a transport protocol for service description publication, discovery and dynamic notification. Thus, a new SIP Event Package is defined, hereafter called service, which enables the exchange of service descriptions over a SIP-based network.

Figure 5:
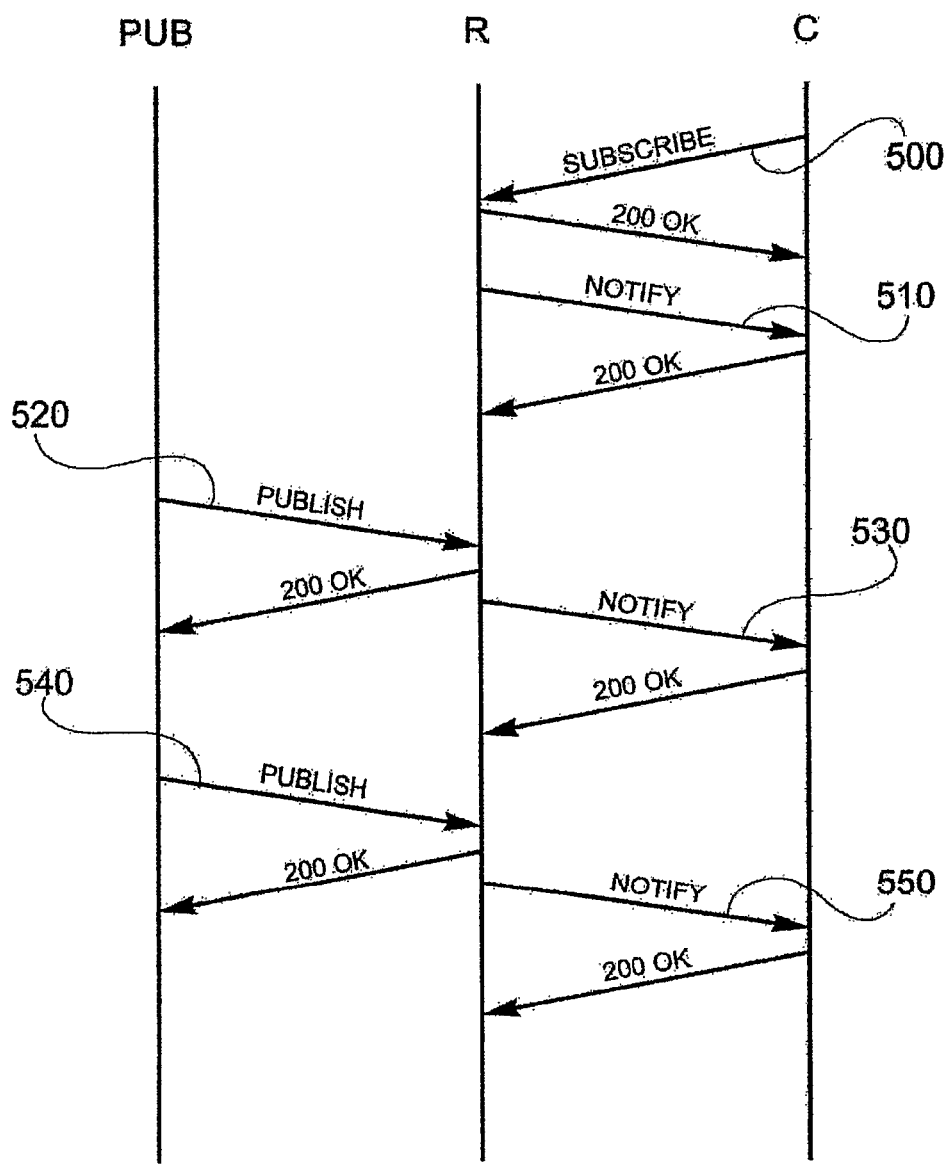
FIG. 5 is a message sequence chart of a service description publication and notification mechanism.

FIG. 5 shows a message sequence chart of publication and notification mechanism according to the invention, illustrating the message flows between the publisher entity PUB, the registry R and the client application C using SIP protocol.

The client application C subscribes first to the registry R for service description notifications (message 500), it gets acknowledgement by the registry R through a SIP response message 200 OK of known type to a man skilled in the art, then it gets immediately notified (message 510) about current service description D, if available, and sends in turn its acknowledgement SIP message 200 OK.

Then, publisher entity PUB publishes a new service description D to the registry R (message 520), which immediately, in an asynchronous way, notifies all client applications subscribed to this information with the newly updated information (message 530). When, again, a new publication occurs (message 540), the registry R immediately notifies, in an asynchronous way, the client applications again (message 550).

The service description D may be published by the service provider SP itself or by another entity on behalf of it. Advantageously, it may include some extra meta-information such as the category to which the described service belongs to, semantic information, business-related information, etc., derived from UDDI, OWL, OWL-S or other model or language. The service description itself is preferably described as a WSDL content using MIME type "application/wsdl+xml", but it may also be described by other means.

A detailed example of publication using the SIP PUBLISH message of the service description of the streaming (session-based) service of example 2 above is shown below. This message corresponds to messages 520, 540 of FIG. 5.

```
PUBLISH sip:streaming@mycompany.com SIP/2.0
From: sip:streaming@mycompany.com;tag=1234
To: sip:services@mycompany.com
Event: service
Content-Type: application/wsdl+xml
Content-Length: ...
<?xml version="1.0" encoding="utf-8"?>
<definitions
   xmlns:xsd="http://www.w3.org/2001/XMLSchema"
   xmlns:http="http://schemas.xmlsoap.org/wsdl/http/"
   xmlns:mime="http://schemas.xmlsoap.org/wsdl/mime/"
   xmlns:soap="http://schemas.xmlsoap.org/wsdl/soap/"
   xmlns:sip="http://www.mycompany.com/wsdl/sip/"
   xmlns:soapenc="http://schemas.xmlsoap.org/soap/encoding/"
   targetNamespace="http://www.mycompany.com/"
   xmlns="http://schemas.xmlsoap.org/wsdl/">
<message name="request">
     <part name="movie" type="xsd.string"/>
     <part name="offer" type="xsd.string"/>
</message>
<message name="response">
     <part name="answer" type="xsd.string"/>
</message>
<portType name="movieStreaming">
     <operation name="streamMovieTrailer">
        <input message="tns:request"/>
        <output message="tns:response"/>
     </operation>
</portType>
<binding name="sipTrailer" type="streamMovieTrailer">
<sip:binding styleDefault="session" />
<operation name="streamMovieTrailer">
<input>
   <sip:message verb="INVITE" />
         <sip:header part="movie" name="P-Movie" required="true"/>
<mime:content part="offer" type="application/sdp"/>
</input>
```

```
<output>
    <sip:message verb="response" />
<mime:content part="answer" type="application/sdp"/>
</output>
</operation>
</binding>
<service name="streamingService">
    <port name="moviestreamingService" binding="tns:sipTrailer">
        <sip:address location="sip:streaming@mycompany.com"/>
    </port>
</service>
</definitions>
```

The actual behavior of the receiver of the published information is not defined in this invention. However, it is foreseen that a network element receiving this information may publish it again using different mechanisms (e.g. HTTP), or store or save them to persistent or volatile component (file, database, etc.). It may also add or remove some information retrieved remotely or locally by these means or by another means, such as presence and availability information. It may also compose this information to aggregate similar service descriptions into a single one, for example for a single service accessible through different SIP URIs.

The discovery process as a whole regards both instant fetch of data and asynchronous notification. It may be performed by different techniques and protocols and may include some data (e.g. defined in XML) to filter or condition the information to be received.

In the example below the discovery process is based on a subscription triggered by a SIP SUBSCRIBE message that enables asynchronous notification of information during the subscription duration. The discovery process may be performed for a single service or for a list of services, whether is the services contained in the list are known a priori or not. This message corresponds to message 500 of FIG. 5.

```
SUBSCRIBE sip:services@mycompany.com SIP/2.0
From: sip:user@mycompany.com;tag=1234
To: sip:services@mycompany.com
Event: service
Require: eventlist
Expires: 3600
Contact: sip:user@host.mycompany.com
Content-Length: 0
```

The single service description or list of service descriptions returned may be of any type of content and is formatted, for example, according to the formalism of the invention. It is returned either inline or in an indirected way (for example using an HTTP URL). This message corresponds either to messages 510, 530 or 550 of FIG. 5.

```
NOTIFY sip:user@host.mycompany.com SIP/2.0
To: sip:user@mycompany.com;tag=1234
From: sip:services@mycompany.com;tag=abcd
Event: service
Subscription-State: active;expires=3600
Require: eventlist
Content-Type: multipart/related;type="application/rlmi+xml";
        start="<2BEI83@mycompany.com>";boundary=
        "TfZxoxgAvLqgj4wRWPDL"
Content-Length: ...
    --TfZxoxgAvLqgj4wRWPDL
    Content-Transfer-Encoding: binary
    Content-ID: <2BEI83@mycompany.com>
    Content-Type: application/rlmi+xml;charset="UTF-8"
<?xml version="1.0" encoding="UTF-8"?>
    <list xmlns="urn:ietf:params:xml:ns:rmli"
            uri="sip:services@mycompany.com" version="2"
            name="Available services provided by mycompany"
            fullState="true">
        <resource uri="sip:streaming@mycompany.com"
        name="Movie streaming">
            <instance id="sdlkmeopdf" state="active"
            cid="mrEakg@mycompany.com"/>
        </resource>
        <resource uri=
        "http://www.mycompany.com/webservices/trafficservice"
                        name="Traffic Information">
            <instance id="cmpqweitlp" state="pending"/>
        </resource>
    </list>
    --TfZxoxgAvLqgj4wRWPDL
    Content-Transfer-Encoding: binary
    Content-ID: < mrEakg@mycompany.com >
    Content-Type: application/wsdl+xml;
    [WSDL document (i.e. the published document defined above)]
    --TfZxoxgAvLqgj4wRWPDL--
```

Once the client application C has retrieved the service description D, using for example the preferred method defined above, and the user wishes to invoke the corresponding service S, the client application C reads the service description D and, according to the formalism and the description of the service, builds the message to be sent to the server SP that corresponds to the specific service to invoke.

The message is then sent on the link $L_{invoke}$ from the client application C to the server SP, which process it and recognizes that this message corresponds to a specific service S since its content is conform to the service description D. The server SP executes the service S according to its internal service logic and the information contained in the message sent by the client application C. The server SP produces an output message formatted according the formalism and the description of the service S, which corresponds to the result of the service logic execution, and sends it to the client application C.

The client application C receives the output message from the server SP that corresponds to the result of the service logic execution. Using the service description D it already has locally, the client application C reads the content of the output message and interprets it in a proper way according to the formalism defined in this invention.

As mentioned in the foreground, the above-described mechanisms also apply when server SP corresponds to another client application.

For example, an inter-personal communication service S, such as a multimedia session-based service between two client applications C in a communication network, can be described through a service description D, which is provided by a standalone service description provider DP, such a provider knowing a priori remote interaction mechanisms supported by client applications in the communication network.

One of client applications C retrieves service description D from service description provider DP, and invoke multimedia session-based service S to the other client application C according to remote interaction mechanisms already described in service description D.

Advantageously, the method is expected to answer the dynamic creation and provision of services when the number of services available to users will change very fast, to allow client applications to be permanently updated about available services and how to interact with them a priori.

Advantageously, this invention applies to any kind of service that interacts with SIP messages, including but not limited to session-, subscription-based services, information services, messaging services, presence-based services, and any other kind of service supplied, for example, over a protracted time.

This invention does not limit itself to SIP-based services as such, but also applies to SIP-based resources, such as enduser application (i.e. user agent), proxy, application server, multipoint conference unit, media gateway, media server, applications on top of application servers, network and home appliances, etc. Like services, resources can also describe their remote interaction mechanisms in the way defined in this invention.

As well, this invention also covers the description of services that use SIP messages to interact with non-SIP services or resources, i.e. services or resources that do not implement the full SIP protocol and which primary function is not SIP-related but that do send and/or receive SIP-based messages. Examples of such resources are network appliances that send a SIP message to publish some information or receive some command or query through a SIP message.

The information covered by this invention relates at least to remote service interaction and semantic description (intended as human- and machine-readable definition). This description may be defined using WSDL description language or other languages.

Additionally, the method and system of the present invention can be further extended to allow client applications to sub-scribe to information about users subscribed to service description information according to the present invention. Advantageously, the client applications may be updated, for example, about which service descriptions one or more specific users are subscribed to, or which users are subscribed to one or more service descriptions.

Naturally, the principle of the invention remaining the same, the forms of embodiment may be varied widely with respect to those described and illustrated purely by way of non-limiting example, without thereby departing from the scope of protection of the present invention defined by the appended claims.

The invention claimed is:

1. A method of interaction between a requesting entity including at least one SIP based resource and a processor and a responding entity including at least one SIP based resource and a processor, on a communication network based on session initiation protocol, comprising the steps of:
   retrieving, by the requesting entity, a machine-readable service description from a service description provider, the machine-readable service description comprising specifications of interaction between the requesting entity invoking a service and the responding entity offering the service, said specifications comprising at least a set of rules comprising abstract input/output message formats and session initiation protocol binding rules, wherein the abstract input message format comprises information relating to invoking the service by the requesting entity, and wherein the abstract output message format comprises information relating to the service provided by the responding entity;
   invoking, by the requesting entity, the service to a session initiation protocol uniform resource identifier by means of a session initiation protocol invocation message patterned according to said retrieved machine-readable service description;
   interpreting, by the requesting entity, the service provided by the responding entity according to said machine-readable service description;
   receiving, by at least one of the requesting entity or the responding entity, a dynamic notification regarding an updated machine-readable service description comprising the specifications of interaction; and
   retrieving, by the requesting entity, the updated machine-readable service description including the session initiation protocol binding rules.

2. The method according to claim 1, comprising a step of providing said service over a protracted time.

3. The method according to claim 2, wherein the service is a session-based service, and said step of providing said service over a protracted time comprises the step of sending and/or receiving service data related to the service continuously in time.

4. The method according to claim 2, wherein the service is a subscription-based service, and said step of providing said service over a protracted time comprises the step of sending and/or receiving service data related to the service intermittently at different points of time.

5. The method according to claim 3, wherein the machine-readable service description comprises a specification of a media type employed in the session-based service.

6. The method according to claim 4, wherein the machine-readable service description comprises a specification of the duration of the subscription-based service.

7. The method according to claim 4, wherein the machine-readable service description comprises a specification of a notification mode of the subscription-based service.

8. The method according to claim 7, wherein the notification mode comprises a specification of an interval of notification for a periodic notification.

9. The method according to claim 4, wherein the machine-readable service description includes a specification of a type of event to be considered within the subscription-based service.

10. The method according to claim 1, wherein the machine-readable service description is drafted according to web service description type language.

11. The method according to claim 1, wherein the step of providing said machine-readable service description comprises the steps of:
    creating said machine-readable service description; and
    making available said machine-readable service description to the requesting entity.

12. The method according to claim 11, wherein the step of making available said machine-readable service description comprises the step of:
    directly accessing said machine-readable service description document by the requesting entity at the responding entity offering the service.

13. The method according to claim 11, wherein the step of making available said machine-readable service description comprises the steps of:
    publishing said machine-readable service description or a pointer thereto to a remote publication server; and
    retrieving said service description document directly at the remote publication server.

14. The method according to claim 11, wherein the step of making available said machine-readable service description comprises the step of:
    publishing said machine-readable service description or a pointer thereto to a service information registry accessible by the requesting entity.

15. The method according to claim 14, wherein the registry is able to aggregate a single machine-readable service description from a plurality of published machine-readable service descriptions.

16. The method according to claim 14, wherein the requesting entity accesses said machine-readable service description by subscribing to a service information notification service provided by the registry, service information comprising availability of at least one service and at least one corresponding machine-readable service description.

17. The method according to claim 16, wherein the step of subscribing to a service information notification service comprises the step of inserting filtering conditions.

18. The method according to claim 16, wherein the registry is able to asynchronously notify the subscribed requesting entity on changes in service information as published to the registry.

19. A system of interaction between a requesting entity and a responding entity on a communication network based on session initiation protocol, comprising:
a memory;
the responding entity including at least one SIP based resource and a processor, the responding entity being configured to process a request received from the requesting entity and provide a response to the request;
the requesting entity including at least one SIP based resource and a processor, the requesting entity being arranged to invoke a service session initiation protocol uniform resource identifier by means of an invocation message patterned according to a predetermined machine-readable service description and to interpret the response provided by the responding entity according to the machine-readable service description,
said machine-readable service description comprising specifications of interaction between the requesting entity and the responding entity, said specifications comprising at least a set of rules comprising abstract input/output message formats and session initiation protocol binding rules,
wherein the abstract input message format comprises information relating to invoking a service by the requesting entity, and wherein the abstract output message format comprises information relating to the service provided by the responding entity, and
wherein at least one of the requesting entity or the responding entity is further arranged to:
receive a dynamic notification regarding an updated machine-readable service description comprising specifications of interaction; and
retrieve the updated machine-readable service description including the session initiation protocol binding rules.

20. The system according to claim 19, wherein the machine-readable service description comprises at least one session initiation protocol invocation method and at least one or a pattern of session initiation protocol uniform resource identifiers where the service can be accessed.

21. The system according to claim 19, wherein the machine-readable service description comprises headers and information whether a message body is required, and, in the affirmative, content and format of the message body.

22. The system according to claim 19, wherein the service is a session-based service, and the machine-readable service description comprises a specification of a media type employed in the session-based service.

23. The system according to claim 19, wherein the service is a subscription-based service, and the machine-readable service description comprises a specification of a type of event to be considered within the subscription-based service.

24. The system according to claim 23, wherein the machine-readable service description comprises a specification of a notification mode of the subscription-based service.

25. The system according to claim 24, wherein the notification mode comprises a specification of an interval of notification for a periodic notification.

26. The system according to claim 23, wherein the machine-readable service description comprises a specification of a duration of the subscription-based. service.

27. The system according to claim 19, wherein the machine-readable service description is drafted according to web service description type language.

28. The system according to claim 19, comprising a service description provider arranged to create said machine-readable service description and to make available said machine-readable service description to the requesting entity.

29. The system according to claim 28, wherein said service description provider is associated with said responding entity.

30. The system according to claim 28, wherein the requesting entity is arranged to access to said machine-readable service description directly at the service description provider.

31. The system according to claim 28, comprising a service information registry comprising a service database arranged to store said machine-readable service description or a pointer thereto supplied by the service description provider, the requesting entity being arranged to access said service description document through said registry.

32. The system according to claim 31, wherein the registry further comprises a subscription database arranged to store a subscription of the requesting entity to a service information notification service provided by said registry.

33. The system according to claim 32, wherein the registry is arranged to asynchronously notify the requesting entity on changes in service information stored in said service database.

34. A non-transitory computer-readable storage medium encoded with a machine-readable service description for describing interaction between a requesting entity invoking a service on a communication network and a responding entity offering the service, said machine-readable service description comprising specifications of interaction between the requesting entity and the responding entity through session initiation protocol transport protocol, said specifications comprising at least a set of rules comprising input and output abstract message formats and session initiation protocol binding rules,
wherein the input abstract message format comprises information relating to invoking the service by the requesting entity, and wherein the output abstract message format comprises information relating to the service provided by the responding entity,
wherein a dynamic notification regarding an updated machine-readable service description comprising specifications of interaction is provided to at least one of the requesting entity or the responding entity, and
wherein the updated machine-readable service description including the session initiation protocol binding rules is retrieved by the requesting entity.

35. The non-transitory computer-readable storage medium according to claim 34, wherein the machine-readable service description comprises at least one session initiation protocol invocation method and at least one or a pattern of session initiation protocol uniform resource identifiers where the service can be accessed.

36. The non-transitory computer-readable storage medium according to claim 34, wherein the machine-readable service description comprises headers and information whether a message body is required and, in the affirmative, content and format of the message body.

37. The non-transitory computer-readable storage medium according to claim 34, wherein the service is a session-based service, and wherein the machine-readable service description comprises a specification of a media type employed in the session-based service.

38. The non-transitory computer-readable storage medium according to claim 34, wherein the service is a subscription-based service, and wherein the machine-readable service description comprises a specification of a type of event to be considered within the subscription-based service.

39. The non-transitory computer-readable storage medium according to claim 38, said machine-readable service description comprising a specification of a notification mode of the subscription-based service.

40. The non-transitory computer-readable storage medium according to claim 39, said machine-readable service description comprising a specification of an interval of notification for a periodic notification.

41. The non-transitory computer-readable storage medium according to claim 38, said machine-readable service description comprising a specification of a duration of the subscription-based service.

42. The non-transitory computer-readable storage medium according to claim 34, wherein said machine-readable service description is drafted according to web service description type language.

43. A communication network comprising at least a requesting entity and a responding entity, wherein the requesting entity includes at least one SIP based resource and a hardware processor, and is arranged to send a request to the responding entity to invoke a service at the responding entity, wherein the responding entity includes at least one SIP based resource and a hardware processor and is arranged to provide the service in response to the request, and wherein the requesting entity interacts with the responding entity according to a method comprising:
  retrieving, by the requesting entity, a machine-readable service description from a service description provider, the machine-readable service description comprising specifications of interaction between the requesting entity invoking a service and the responding entity offering the service, said specifications comprising at least a set of rules comprising abstract input/output message formats and session initiation protocol binding rules, wherein the abstract input message format comprises information relating to invoking the service by the requesting entity, and wherein the abstract output message format comprises information relating to the service provided by the responding entity;
  invoking, by the requesting entity, the service to a session initiation protocol uniform resource identifier by means of a session initiation protocol invocation message patterned according to said retrieved machine-readable service description;
  interpreting, by the requesting entity, the service provided by the responding entity according to said machine-readable service description;
  receiving, by at least one of the requesting entity or the responding entity, a dynamic notification regarding an updated machine-readable service description comprising the specifications of interaction; and
  retrieving, by the requesting entity, the updated machine-readable service description including the session initiation protocol binding rules.

44. A method for providing a session-based service in a session initiation protocol context, comprising a method of interaction between a requesting entity and a responding entity, the method of interaction comprising:
  retrieving, by the requesting entity, a machine-readable service description from a service description provider, the machine-readable service description comprising specifications of interaction between the requesting entity invoking a service and the responding entity offering the service, said specifications comprising at least a set of rules comprising abstract input/output message formats and session initiation protocol binding rules, wherein the abstract input message format comprises information relating to invoking the service by the requesting entity, and wherein the abstract output message format comprises information relating to the service provided by the responding entity;
  invoking, by the requesting entity, the service to a session initiation protocol uniform resource identifier by means of a session initiation protocol invocation message patterned according to said retrieved machine-readable service description;
  interpreting, by the requesting entity, the service provided by the responding entity according to said machine-readable service description;
  receiving, by at least one of the requesting entity or the responding entity, a dynamic notification regarding an updated machine-readable service description comprising the specifications of interaction; and retrieving, by the requesting entity, the updated machine-readable service description including the session initiation protocol binding rules.

45. A method for providing a subscription-based service in a session initiation protocol context, comprising a method of interaction between a requesting entity and a responding entity, the method of interaction comprising:
  retrieving, by the requesting entity, a machine-readable service description from a service description provider, the machine-readable service description comprising specifications of interaction between the requesting entity invoking a service and the responding entity offering the service, said specifications comprising at least a set of rules comprising abstract input/output message formats and session initiation protocol binding rules, wherein the abstract input message format comprises information relating to invoking the service by the requesting entity, and wherein the abstract output message format comprises information relating to the service provided by the responding entity;
  invoking, by the requesting entity, the service to a session initiation protocol uniform resource identifier by means of a session initiation protocol invocation message patterned according to said retrieved machine-readable service description;
  interpreting, by the requesting entity, the service provided by the responding entity according to said machine-readable service description;
  receiving, by at least one of the requesting entity or the responding entity, a dynamic notification regarding an updated machine-readable service description comprising the specifications of interaction; and
  retrieving, by the requesting entity, the updated machine-readable service description including the session initiation protocol binding rules.

* * * * *